United States Patent
Kang

(10) Patent No.: US 11,527,159 B2
(45) Date of Patent: Dec. 13, 2022

(54) REAR LATERAL BLIND-SPOT WARNING SYSTEM AND METHOD FOR VEHICLE

(71) Applicant: HYUNDAI MOBIS CO., LTD., Seoul (KR)

(72) Inventor: Eun Seok Kang, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/408,775

(22) Filed: Aug. 23, 2021

(65) Prior Publication Data

US 2022/0068135 A1 Mar. 3, 2022

(30) Foreign Application Priority Data

Aug. 31, 2020 (KR) .................. 10-2020-0110288

(51) Int. Cl.
*G08G 1/16* (2006.01)
(52) U.S. Cl.
CPC ..................... *G08G 1/16* (2013.01)
(58) Field of Classification Search
None
See application file for complete search history.

(56) References Cited

U.S. PATENT DOCUMENTS

| 2004/0189451 A1* | 9/2004 | Zoratti ............. G08G 1/166 340/435 |
| 2008/0106459 A1 | 5/2008 | Jordan |
| 2016/0252610 A1 | 9/2016 | Smith et al. |
| 2017/0174262 A1* | 6/2017 | Kobayashi ......... B62D 15/0265 |

FOREIGN PATENT DOCUMENTS

| EP | 3 184 394 A1 | 6/2017 |
| KR | 10-2014-0019571 A | 2/2014 |

OTHER PUBLICATIONS

Extended European Search Report issued in corresponding European Patent Application No. 21191110.2 dated Feb. 2, 2022.

* cited by examiner

*Primary Examiner* — John F Mortell
(74) *Attorney, Agent, or Firm* — Morgan, Lewis & Bockius LLP

(57) ABSTRACT

A rear lateral blind-spot warning system for a vehicle includes a sensor configured to sense position information and movement information on an external obstacle, a determiner configured to determine the type of the external obstacle located in a rear blind spot or a lateral blind spot of the vehicle based on the position information and the movement information sensed by the sensor, a setter configured to set a rear lateral blind-spot warning range or a rear lateral blind-spot warning time based on the type of the external obstacle determined by the determiner, and a controller configured to control rear lateral blind-spot warning operation based on the rear lateral blind-spot warning range or the rear lateral blind-spot warning time set by the setter.

16 Claims, 11 Drawing Sheets

REAR LATERAL BLIND-SPOT WARNING SYSTEM AND METHOD FOR VEHICLE

CROSS-REFERENCE TO THE RELATED APPLICATION

This application claims priority from Korean Patent Application No. 10-2020-0110288, filed on Aug. 31, 2020, in the Korean Intellectual Property Office, the disclosure of which is incorporated herein by reference in its entirety.

BACKGROUND

1. Technical Field

The present disclosure relates to a rear lateral blind-spot warning system, and more particularly to a technology for recognizing whether a vehicle located in a rear blind spot or a lateral blind spot of a host vehicle is a large vehicle and controlling a rear lateral blind-spot warning system based on the result of the recognition.

2. Description of the Related Art

A rear lateral blind-spot warning system is a system that senses a vehicle approaching a lateral blind spot or a rear blind spot of a host vehicle and announces this situation in advance. Most rear lateral blind-spot warning systems utilize an ultrasonic sensor or a radar sensor in order to sense objects present in the vicinity of a host vehicle.

However, a conventional rear lateral blind-spot warning system is not capable of recognizing whether a vehicle present in a lateral blind spot or a rear blind spot of a host vehicle is a passenger car or a large vehicle. Further, the conventional rear lateral blind-spot warning system recognizes a large vehicle using a detection range set for a passenger car, and thus prematurely terminates the rear lateral blind-spot warning operation in the case where a large vehicle remains in the rear blind spot or the lateral blind spot of the host vehicle.

The information disclosed in this Background section is only for enhancement of understanding of the general background of the present disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide a rear lateral blind-spot warning system and method capable of recognizing whether an external obstacle located in a rear blind spot or a lateral blind spot of a host vehicle is a passenger car or a large vehicle and of, when the external obstacle is determined to be a large vehicle, increasing a rear lateral blind-spot warning range or a rear lateral blind-spot warning time, thereby accurately recognizing the large vehicle located in the rear blind spot or the lateral blind spot of the host vehicle and accurately announcing the result of recognition to a driver.

In accordance with an aspect of the present disclosure, the above and other objects can be accomplished by the provision of a rear lateral blind-spot warning system for a vehicle, including a sensor configured to sense position information and movement information on an external obstacle, a determiner configured to determine the type of the external obstacle located in a rear blind spot or a lateral blind spot of the vehicle based on the position information and the movement information sensed by the sensor, a setter configured to set a rear lateral blind-spot warning range or a rear lateral blind-spot warning time based on the type of the external obstacle determined by the determiner, and a controller configured to control rear lateral blind-spot warning operation based on the rear lateral blind-spot warning range or the rear lateral blind-spot warning time set by the setter.

The sensor may sense the position information or the movement information on the external obstacle located in the rear blind spot or the lateral blind spot of the vehicle using a radar sensor installed in the vehicle.

The sensor may sense the position information on the external obstacle through sensed detection points.

The determiner may form a predetermined tracking range based on initially sensed detection points and may determine whether the external obstacle is a passenger car or a large vehicle based on detection points located within the predetermined tracking range among the initially sensed detection points.

The determiner may calculate the number of detection points, based on sensing information sensed by the sensor and the movement information or position information on the external obstacle, and may determine that the external obstacle is a large vehicle when the number of the detection points located within the predetermined tracking range is greater than or equal to the calculated number of detection points.

The determiner may determine that the external obstacle is a large vehicle when the number of the detection points located within the predetermined tracking range is greater than or equal to a predetermined number.

The determiner may obtain an individual bit frequency component proportional to the distance by performing an FFT operation on a sensing signal of the sensor, may obtain a Doppler frequency component proportional to the speed by performing the FFT operation on the individual bit frequency component, and may calculate the average frequency power of a warning region based on the distance and the speed, determined using the individual bit frequency component and the Doppler frequency component.

The determiner may determine that the external obstacle is a large vehicle when the average frequency power of the warning region is greater than or equal to a predetermined power value.

When the determiner determines that the external obstacle is a large vehicle, the setter may increase the rear lateral blind-spot warning range such that the same is greater than a predetermined range.

When the determiner determines that the external obstacle is a large vehicle, the setter may increase the rear lateral blind-spot warning time such that the same is greater than a predetermined time.

In accordance with another aspect of the present disclosure, there is provided a rear lateral blind-spot warning method for a vehicle, including a sensing step of sensing position information and movement information on an external obstacle, a determination step of determining the type of the external obstacle located in a rear blind spot or a lateral blind spot of a vehicle based on the position information and the movement information sensed in the sensing step, a setting step of setting a rear lateral blind-spot warning range or a rear lateral blind-spot warning time based on the type of the external obstacle determined in the determination step, and a control step of controlling rear lateral blind-spot warning operation based on the rear lateral blind-spot warning range or the rear lateral blind-spot warning time set in the setting step.

The sensing step may include sensing the position information or the movement information on the external obstacle located in the rear blind spot or the lateral blind spot of the vehicle using a radar sensor installed in the vehicle.

The sensing step may include sensing the position information on the external obstacle through sensed detection points.

The determination step may include forming a predetermined tracking range based on initially sensed detection points and determining whether the external obstacle is a passenger car or a large vehicle based on detection points located within the predetermined tracking range among the initially sensed detection points.

The determination step may include calculating the number of detection points, based on sensing information and the movement information or position information on the external obstacle sensed in the sensing step, and determining that the external obstacle is a large vehicle when the number of the detection points located within the predetermined tracking range is greater than or equal to the calculated number of detection points.

The determination step may include determining that the external obstacle is a large vehicle when the number of the detection points located within the predetermined tracking range is greater than or equal to a predetermined number.

The determination step may include obtaining an individual bit frequency component proportional to the distance by performing an FFT operation on a sensing signal of a sensor, obtaining a Doppler frequency component proportional to the speed by performing the FFT operation on the individual bit frequency component, and calculating the average frequency power of a warning region based on the distance and the speed, determined using the individual bit frequency component and the Doppler frequency component.

The determination step may include determining that the external obstacle is a large vehicle when the average frequency power of the warning region is greater than or equal to a predetermined power value.

The setting step may include increasing the rear lateral blind-spot warning range such that the same is greater than a predetermined range when the external obstacle is determined to be a large vehicle in the determination step.

The setting step may include increasing the rear lateral blind-spot warning time such that the same is greater than a predetermined time when the external obstacle is determined to be a large vehicle in the determination step.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
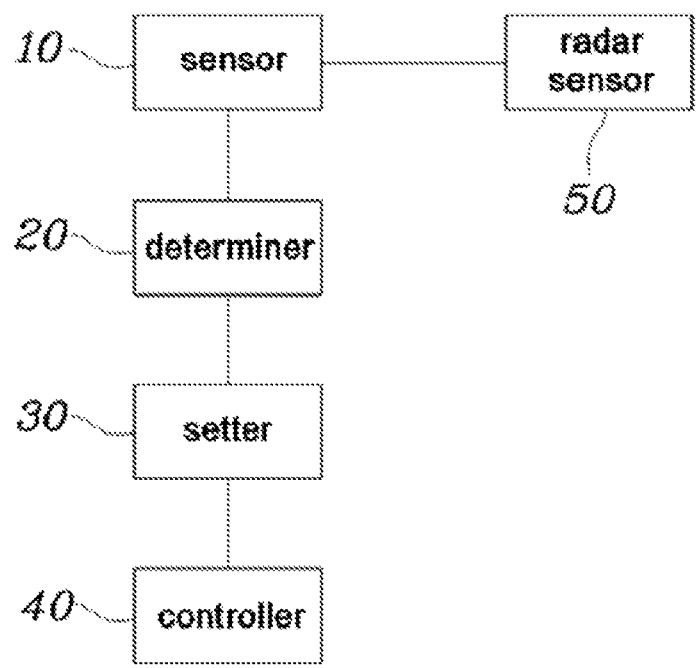
FIG. 1 is a diagram showing the configuration of a rear lateral blind-spot warning system for a vehicle according to an embodiment of the present disclosure.
Figure 2:
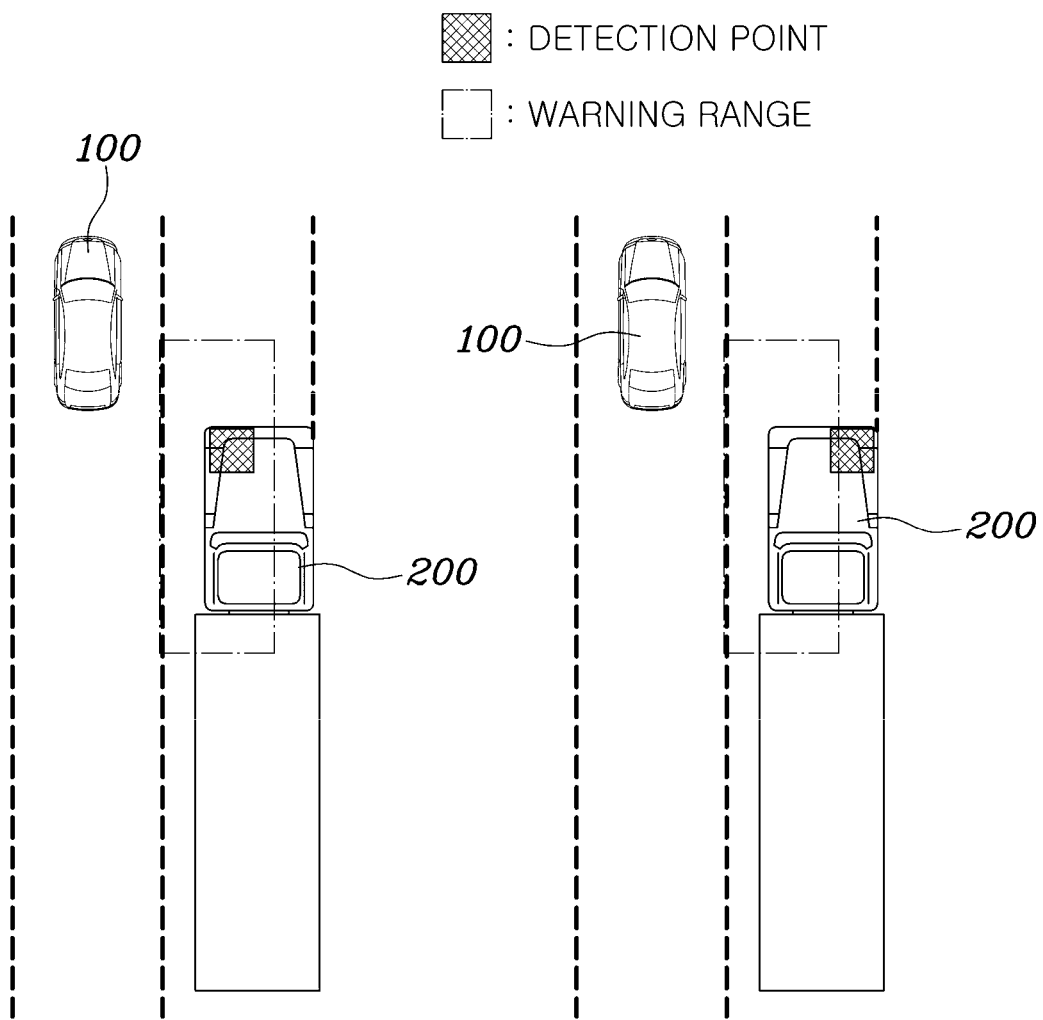
FIGS. 2 to 5 are diagrams showing the case in which a conventional rear lateral blind-spot warning system fails to accurately sense a large vehicle.
Figure 3:
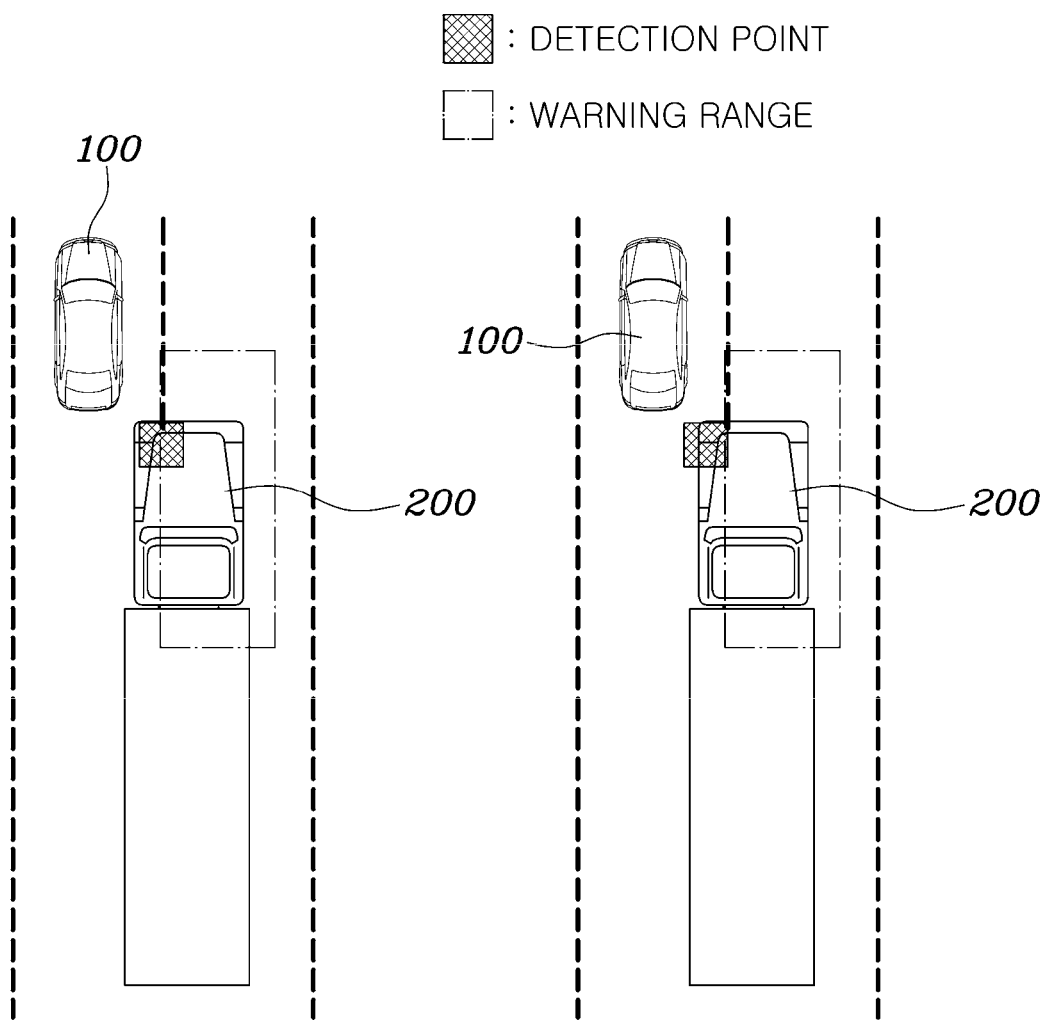
Figure 4:
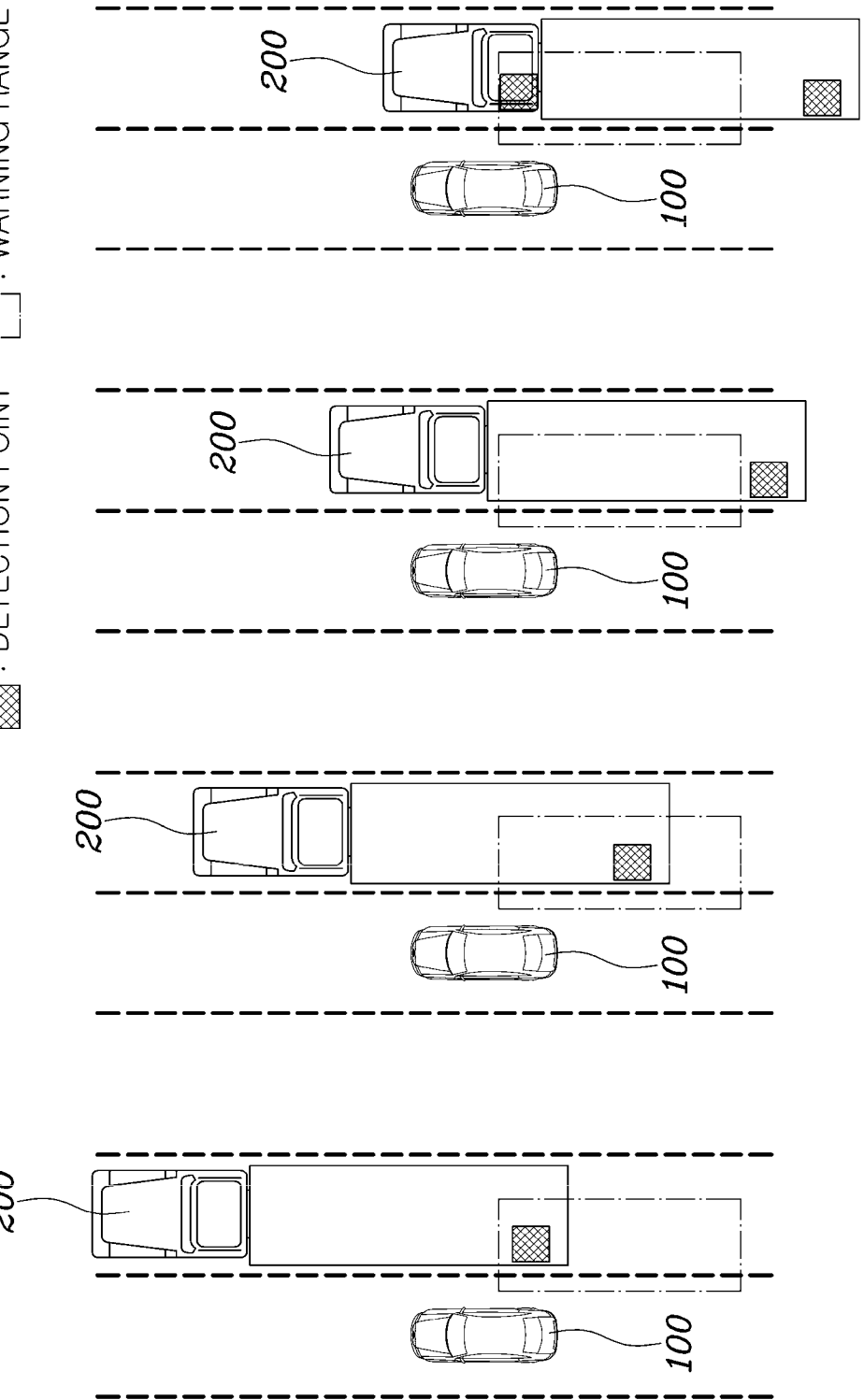
Figure 5:
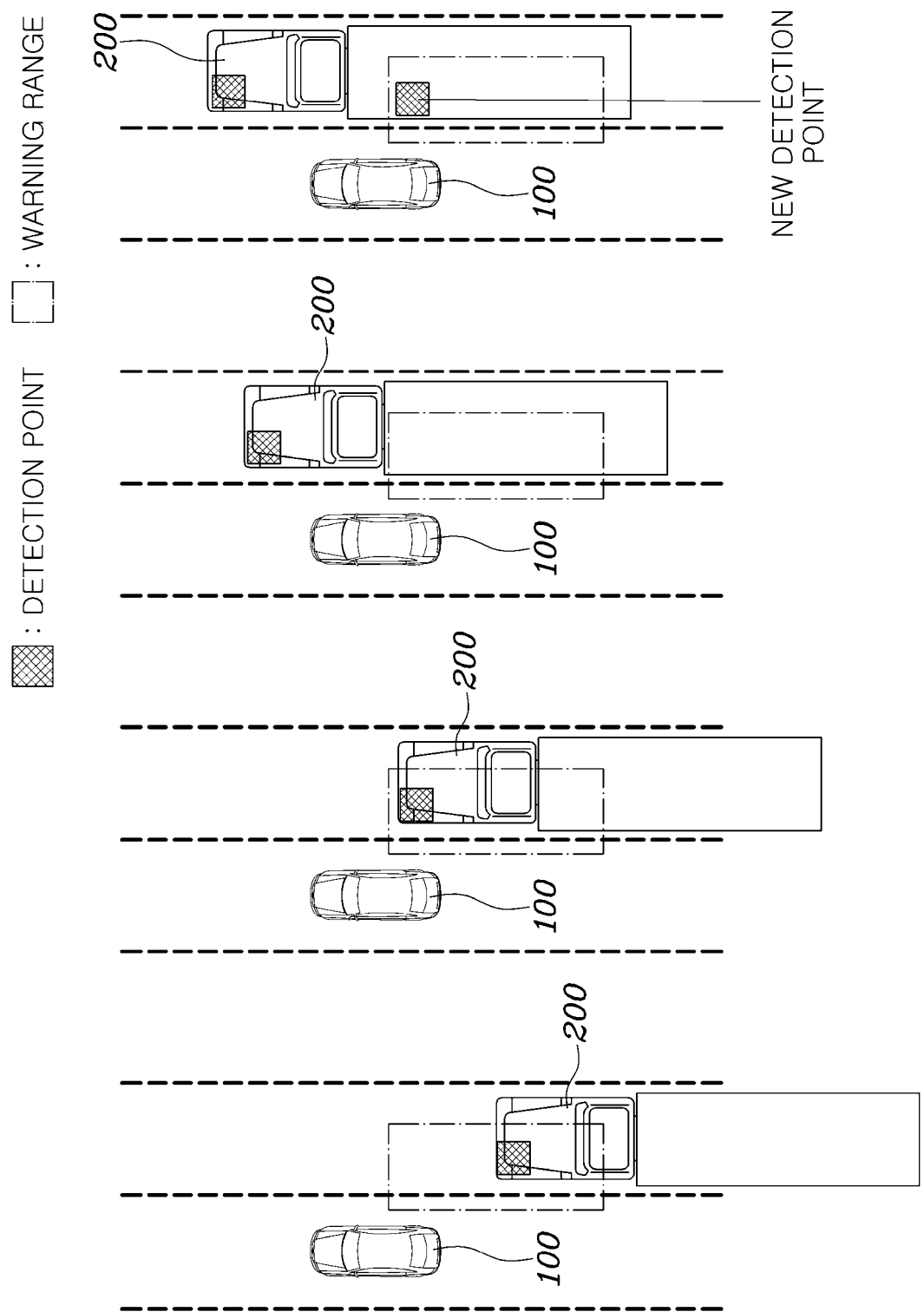

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternative forms, and should not be construed as being limited to the exemplary embodiments set forth herein.

Accordingly, while exemplary embodiments of the present disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the invention.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the present disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, exemplary embodiments of the present disclosure will be described in detail with reference to the accompanying drawings. In the drawings, the same reference numerals refer to the same components.

A sensor 10, a determiner 20, a setter 30, and a controller 40 according to an exemplary embodiment of the present disclosure may be implemented through a processor (not shown) configured to execute the operations to be described below using a nonvolatile memory (not shown), which is configured to store an algorithm for controlling the operation of various components of a vehicle or data related to a software command for executing the algorithm, and using data stored in the corresponding memory. Here, the memory and the processor may be implemented as respective chips. Alternatively, the memory and the processor may be implemented as a single integrated chip. The processor may alternatively take the form of one or more processors.

Figure 6:
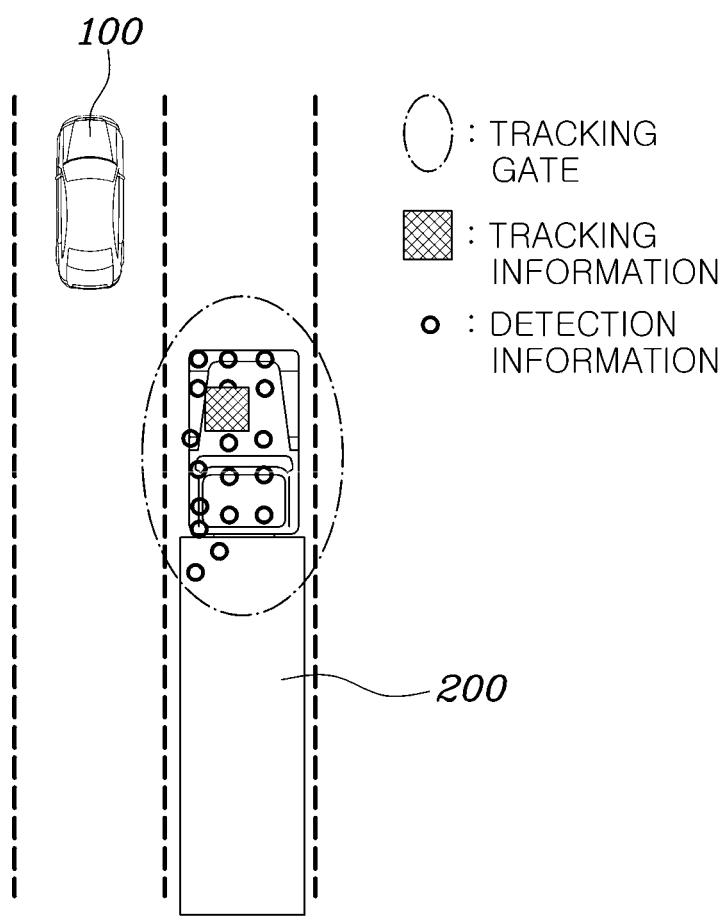
FIG. 6 is a diagram showing the case in which the rear lateral blind-spot warning system for a vehicle according to the embodiment of the present disclosure senses a large vehicle using detection points.
Figure 7:
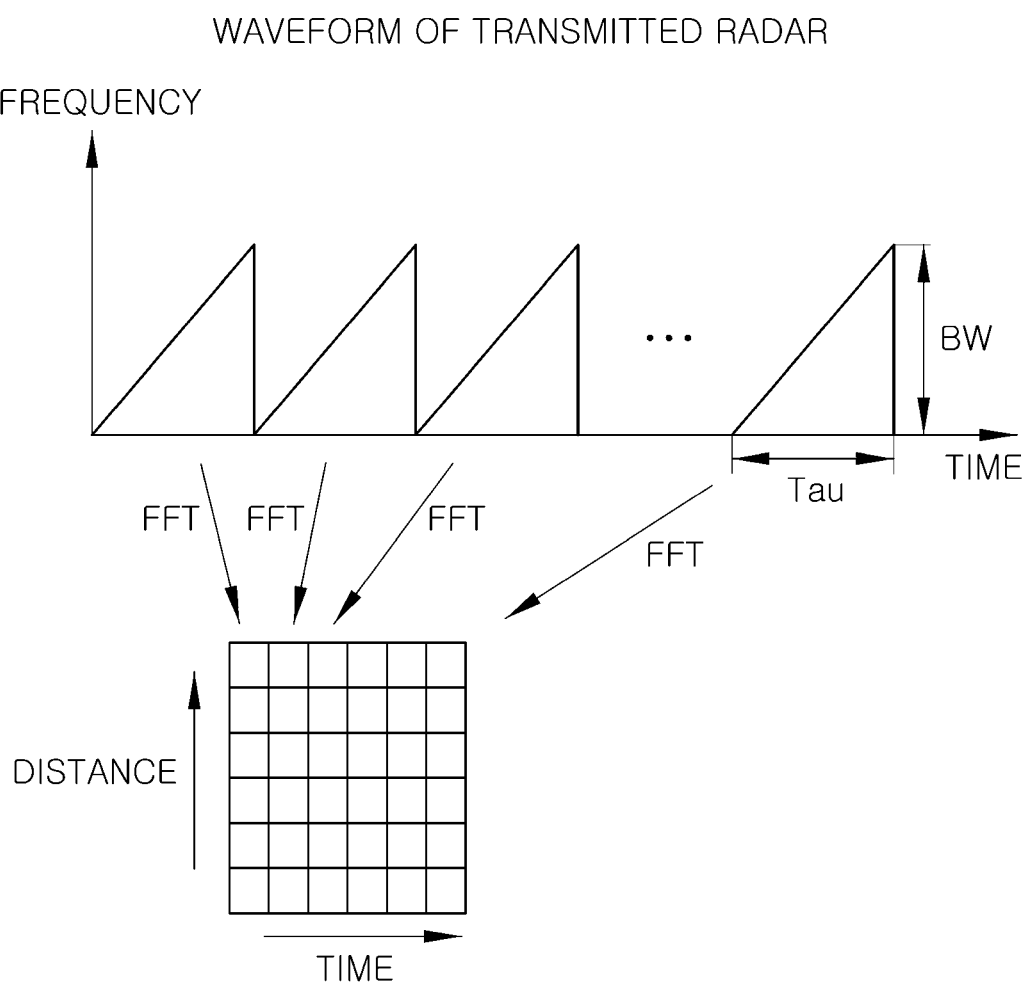
FIGS. 7 to 10 are diagrams showing the case in which the rear lateral blind-spot warning system for a vehicle according to the embodiment of the present disclosure senses a large vehicle using average power within a position range and a speed range using FFT conversion.
Figure 8:
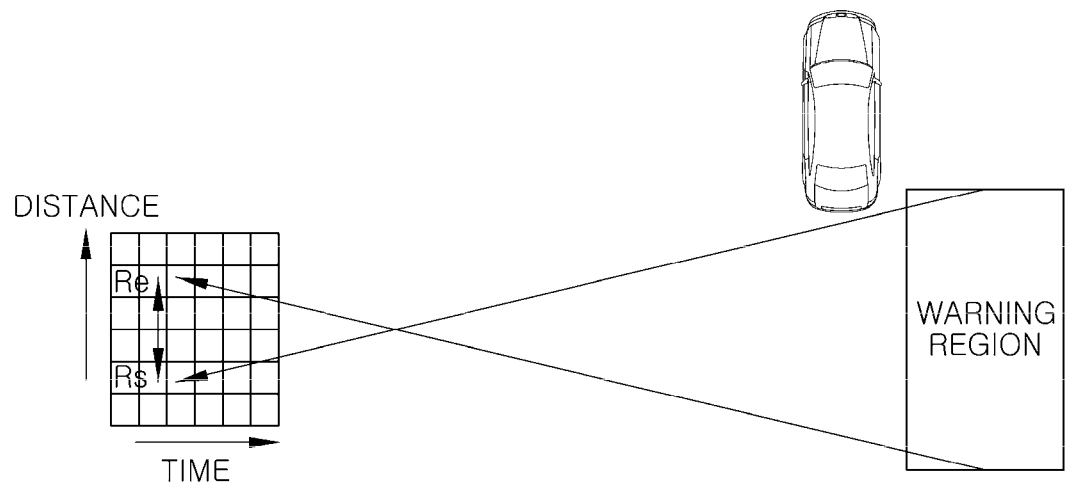
Figure 9:
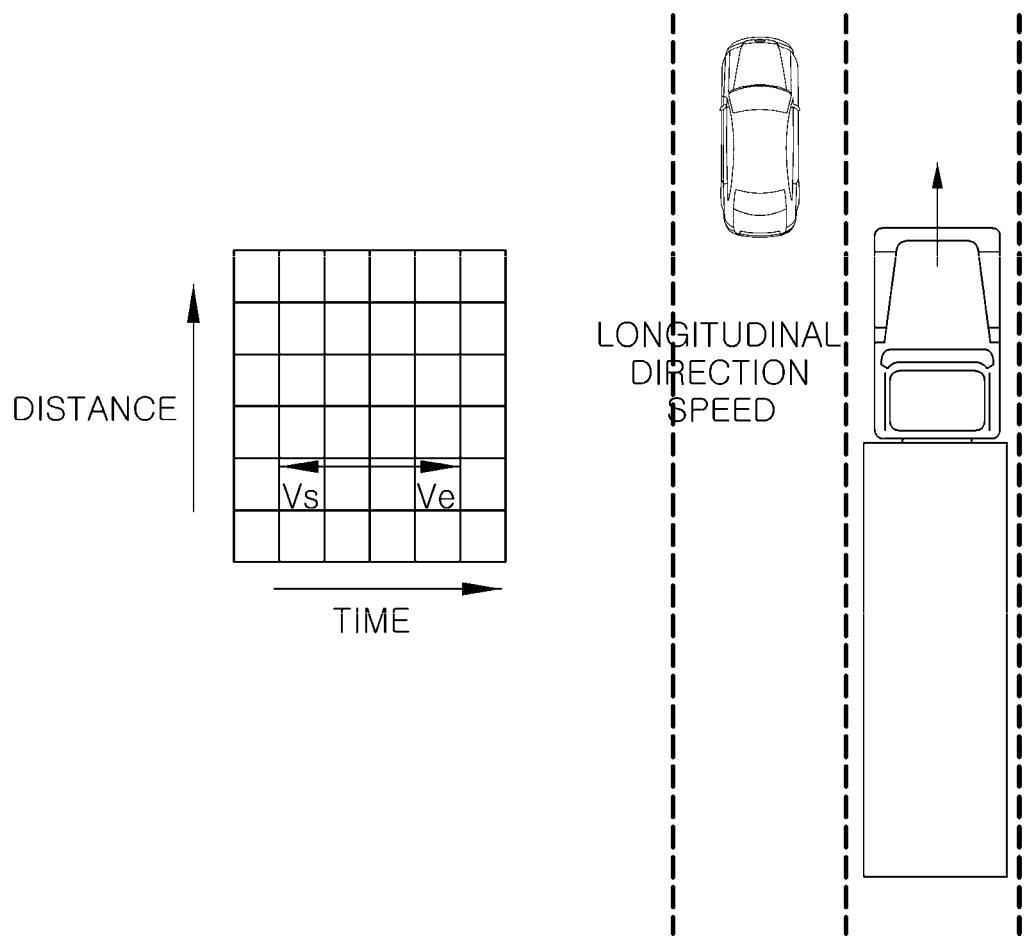
Figure 10:
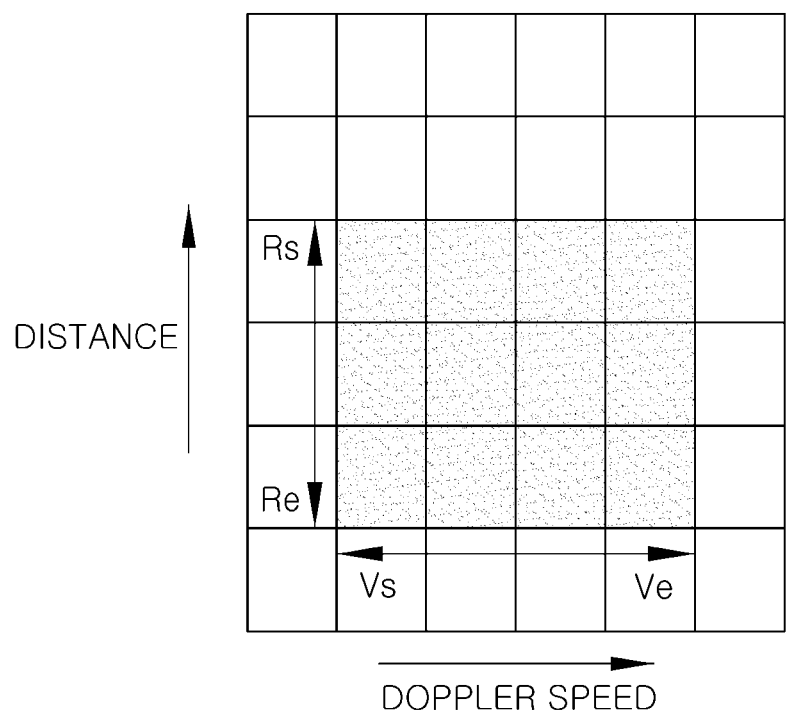

FIG. 1 is a diagram showing the configuration of a rear lateral blind-spot warning system of a vehicle 100 according to an embodiment of the present disclosure. FIGS. 2 to 5 are diagrams showing the case in which a conventional rear lateral blind-spot warning system fails to accurately sense a large vehicle. FIG. 6 is a diagram showing the case in which the rear lateral blind-spot warning system of the vehicle 100 according to the embodiment of the present disclosure senses a large vehicle using detection points. FIGS. 7 to 10 are diagrams showing the case in which the rear lateral blind-spot warning system of the vehicle 100 according to the embodiment of the present disclosure senses a large vehicle using average power within a position range and a speed range using FFT conversion.

Hereinafter, an exemplary embodiment of the rear lateral blind-spot warning system of the vehicle 100 according to the present disclosure will be described with reference to FIGS. 1 to 10.

As shown in FIGS. 2 to 5, in the case of the conventional rear lateral blind-spot warning system, when an external obstacle 200 located in the rear blind spot or the lateral blind spot of the vehicle 100 is a large vehicle, the large vehicle appears to be outside the rear lateral blind spot detection range due to the size thereof. Therefore, even when the large vehicle remains in the rear blind spot or the lateral blind spot of the vehicle 100, the conventional rear lateral blind-spot warning system incorrectly determines that the large vehicle is out of the detection range, and terminates the rear lateral blind-spot warning operation. Herein, "a large vehicle" according to an embodiment of the present disclosure may refer to a vehicle have a size larger than a predetermined size. For example, the size of the large vehicle may be larger than the size of, e.g., a passenger car or a motorcycle.

A rear lateral blind-spot warning system of the vehicle 100 according to the present disclosure includes a sensor 10 configured to sense position information and movement information on the external obstacle 200, a determiner 20 configured to determine the type of external obstacle 200 located in the rear blind spot or the lateral blind spot based on the position information and the movement information sensed by the sensor 10, a setter 30 configured to set a rear lateral blind-spot warning range or a rear lateral blind-spot warning time based on the type of external obstacle 200 determined by the determiner 20, and a controller 40 configured to control the rear lateral blind-spot warning operation based on the rear lateral blind-spot warning range or the rear lateral blind-spot warning time set by the setter 30.

According to one embodiment of the present disclosure, the rear lateral blind-spot warning system of the vehicle 100 may include a processor. The processor may have an associated non-transitory memory storing software instructions which, when executed by the processor, provides the functionalities of the determiner 20 and/or the setter 30. The processor may take the form of one or more processor(s) and associated memory storing program instructions, and in some examples the one or more processor(s) may be used to implement the functions of both the processor and the controller 40.

The sensor 10 may sense position information or movement information on the external obstacle 200 located in the rear blind spot or the lateral blind spot of the vehicle 100. The external obstacle 200 may be another vehicle, a motorcycle, or the like that is traveling behind the vehicle 100. The position information is information regarding data on the relative positions of the external obstacle 200 and the vehicle 100, and the movement information is information regarding data on the relative speeds of the vehicle 100 and the external obstacle 200.

The determiner 20 may determine the size of the external obstacle 200 based on the position information or the movement information on the external obstacle 200 sensed by the sensor 10, and may determine the type of external obstacle 200, for example, whether the external obstacle 200 is a large vehicle or a passenger car.

When the determiner 20 determines that the external obstacle 200 is a large vehicle, the setter 30 may set the rear lateral blind-spot warning time such that the entire body of the large vehicle is sensed for a predetermined increased time period, and may set the rear lateral blind-spot warning range such that the entire body of the large vehicle is sensed within a predetermined increased range.

The controller 40 may control the rear lateral blind-spot warning operation based on the rear lateral blind-spot warning time or the rear lateral blind-spot warning range set by the setter 30.

Accordingly, when a large vehicle is located in the rear blind spot or the lateral blind spot of the vehicle 100, it is possible to minimize or prevent the likelihood of a collision between the vehicle 100 and the large vehicle due to termination of a blind spot warning signal in the state in which the large vehicle remains in the rear blind spot or the lateral blind spot of the vehicle 100.

The sensor 10 senses the position information or the movement information on the external obstacle 200, which is located in the rear blind spot or the lateral blind spot of the vehicle 100, using a radar sensor 50 installed in the vehicle 100.

The term "radar" is an acronym for "radio detection and ranging". The radar sensor 50 is a wireless monitoring apparatus that fires an electromagnetic wave (millimeter wave) in a band near 24 GHz or 77 GHz to an object and receives the electromagnetic wave reflected from the object, thereby sensing the distance to the object, the orientation of the object, and the altitude of the object.

In an example, the radar sensor 50 is installed on the rear-side portion of the vehicle, and includes a transmitter for generating a radio wave, an antenna (scanner) for radiating the radio wave, a receiver for receiving the reflected radio wave, and an indicator for displaying an image on a screen. The radio wave generated by the transmitter is usually a millimeter wave. If the radio wave is continuously radiated, it is not possible to know the time point at which the reflected radio wave was fired. Therefore, the radar sensor 50 performs sensing in an intermittent radiation manner of radiating radio waves for a short time period (e.g. 1 to 6 seconds), receiving the radio waves, and then again radiating radio waves. The number of radio waves (millimeter waves) that are radiated in 1 second is about 1,000, and the propagation speed of a millimeter wave is 300,000 km per second. Based thereon, it is possible to obtain the distance to a target object by measuring the time taken until the reflected wave is received.

The sensor 10 may be connected to the radar sensor 50 installed on the rear portion or the side portion of the vehicle 100 in order to sense the external obstacle 200. The sensor 10 may also sense the external obstacle 200 using an ultrasonic sensor or a camera sensor, in addition to the radar sensor 50.

The sensor 10 senses the position information on the external obstacle 200 through detection points that are sensed.

The electromagnetic wave from the radar sensor 50 is reflected from the external obstacle 200, whereby detection points are formed. The sensor 10 may sense the external obstacle 200 through the detection points. The detection points are continuously formed during the period of radiation of electromagnetic waves from the radar sensor 50, thereby enabling continuous sensing of the position information on the external obstacle 200.

The determiner 20 forms a predetermined tracking range based on the initially sensed detection points and determines whether the external obstacle 200 is a passenger car or a large vehicle based on the detection points located within the tracking range among the initially sensed detection points.

As shown in FIG. 6, the determiner 20 may set a tracking range (gate) based on the detection points of the external obstacle 200 sensed by the sensor 10 in the initial stage, may check the number of detection points sensed by the radar sensor 50, may determine that the external obstacle 200 is a large vehicle when the number of detection points located within the detection range is greater than or equal to a predetermined number, and may determine that the external obstacle 200 is a passenger car or a motorcycle when the number of detection points located within the detection range is less than the predetermined number.

The determiner 20 calculates the number of detection points, based on the information sensed by the sensor 10 and the movement information or position information on the external obstacle 200, and determines that the external obstacle 200 is a large vehicle when the number of detection points located within the detection range is greater than or equal to the calculated number of detection points.

The determiner 20 may set the number of detection points $Number_{trailer}$ such that the same is proportional to the sensing information (TP: tuning parameter) on the external obstacle 200 sensed by the sensor 10 and is inversely proportional to the position information ($\Delta R$: distance resolution, $\Delta R_{step}$: distance step size) and the movement information ($\Delta V$: speed resolution, $\Delta V_{step}$: speed step size) on the external obstacle. The number of detection points may be calculated using the following equations.

$$Number_{trailer} = \frac{TP}{\Delta R \cdot \Delta V}$$

$$Number_{trailer} = \frac{TP}{\Delta R_{step} \cdot \Delta V_{step}}$$

The determiner 20 determines that the external obstacle 200 is a large vehicle when the number of detection points located within the tracking range is greater than or equal to a predetermined number.

The determiner 20 calculates the number of detection points using the above equations, checks the number of detection points located within the tracking range based on the calculated number of detection points, and determines that the external obstacle 200 is a large vehicle when the number of detection points located within the tracking range is greater than or equal to the calculated number of detection points.

In this way, the determiner 20 may determine whether the external obstacle 200 is a passenger car or a large vehicle, and the setter 30 may set, based on the result of the determination, the rear lateral blind-spot warning range or the rear lateral blind-spot warning time of the vehicle 100.

The determiner 20 obtains an individual bit frequency component proportional to the distance by performing a fast Fourier transform (FFT) operation on the sensing signal of the sensor 10, obtains a Doppler frequency component proportional to the speed by performing the FFT operation on the individual bit frequency component, and calculates the average frequency power of the warning region based on the distance and the speed, determined using the individual bit frequency component and the Doppler frequency component.

The radar sensor 50 may continuously sense the external obstacle 200 for a certain time period. The waveform of the radar sensor 50 may be converted into a value in a coordinate plane through the FFT operation. The determiner 20 may obtain an individual bit frequency component proportional to the distance by performing the FFT operation once on the waveform of the radar sensor 50, and may obtain a Doppler frequency component proportional to the speed by performing the FFT operation twice on the waveform of the radar sensor 50, thereby forming a coordinate plane. Thereafter, the determiner 20 may set detection ranges for a distance region (Rs–Re) and a speed region (Vs–Ve) sensed by the sensor 10.

In this way, the determiner 20 may check and determine the frequency detection region of the radar sensor 50 in a coordinate plane and may continuously check the detection of the external obstacle 200.

When the average frequency power of the warning region is greater than or equal to a predetermined power value, the determiner 20 determines that the external obstacle 200 is a large vehicle.

Upon determining that the average frequency power checked in the detection range set by the determiner 20 is greater than or equal to the predetermined power value, the determiner 20 may determine that the external obstacle 200 located in the rear blind spot or the lateral blind spot of the vehicle 100 is a large vehicle. The average frequency power may be continuously checked based on the period of the frequency of the radar sensor 50.

The average frequency power $P_{ave}$ may be calculated using the following equation.

$$P_{ave} = \frac{1}{N}\frac{1}{M}\sum_{i=Rs}^{Re}\sum_{j=Vs}^{Ve}P_{i,j}$$

where N=Re−Rs+1, M=Ve−Vs+1

In this way, it is possible to continuously and accurately determine the type of external obstacle.

When the determiner 20 determines that the external obstacle 200 is a large vehicle, the setter 30 increases the rear lateral blind-spot warning range such that the same is greater than a predetermined range.

When the determiner 20 determines that the external obstacle 200 is a large vehicle, the setter 30 may increase the rear lateral blind-spot warning range from a predetermined passenger-car detection range to a predetermined large-vehicle detection range.

Accordingly, when a large vehicle is located in the rear blind spot or the lateral blind spot of the vehicle 100, the setter 30 sets the rear lateral blind-spot warning range to be increased, and the controller 40 controls the rear lateral blind-spot warning operation in response to the setting of the setter 30, thereby accurately sensing the large vehicle located in the rear blind spot or the lateral blind spot, thus accurately announcing the result of sensing to the driver.

When the determiner 20 determines that the external obstacle 200 is a large vehicle, the setter 30 increases the rear lateral blind-spot warning time such that the same is greater than a predetermined time.

When the determiner 20 determines that the external obstacle 200 is a large vehicle, the setter 30 may increase the rear lateral blind-spot warning time from a predetermined passenger-car detection time to a predetermined large-vehicle detection time.

Accordingly, when a large vehicle is located in the rear blind spot or the lateral blind spot of the vehicle 100, the setter 30 sets the rear lateral blind-spot warning time so as to increase the same, and the controller 40 controls the rear lateral blind-spot warning operation in response to the setting of the setter 30 such that the rear lateral blind-spot warning operation is performed for a longer time period after the large vehicle is sensed, thereby accurately announcing the result of sensing of the large vehicle located in the rear blind spot or the lateral blind spot to the driver.

Figure 11:
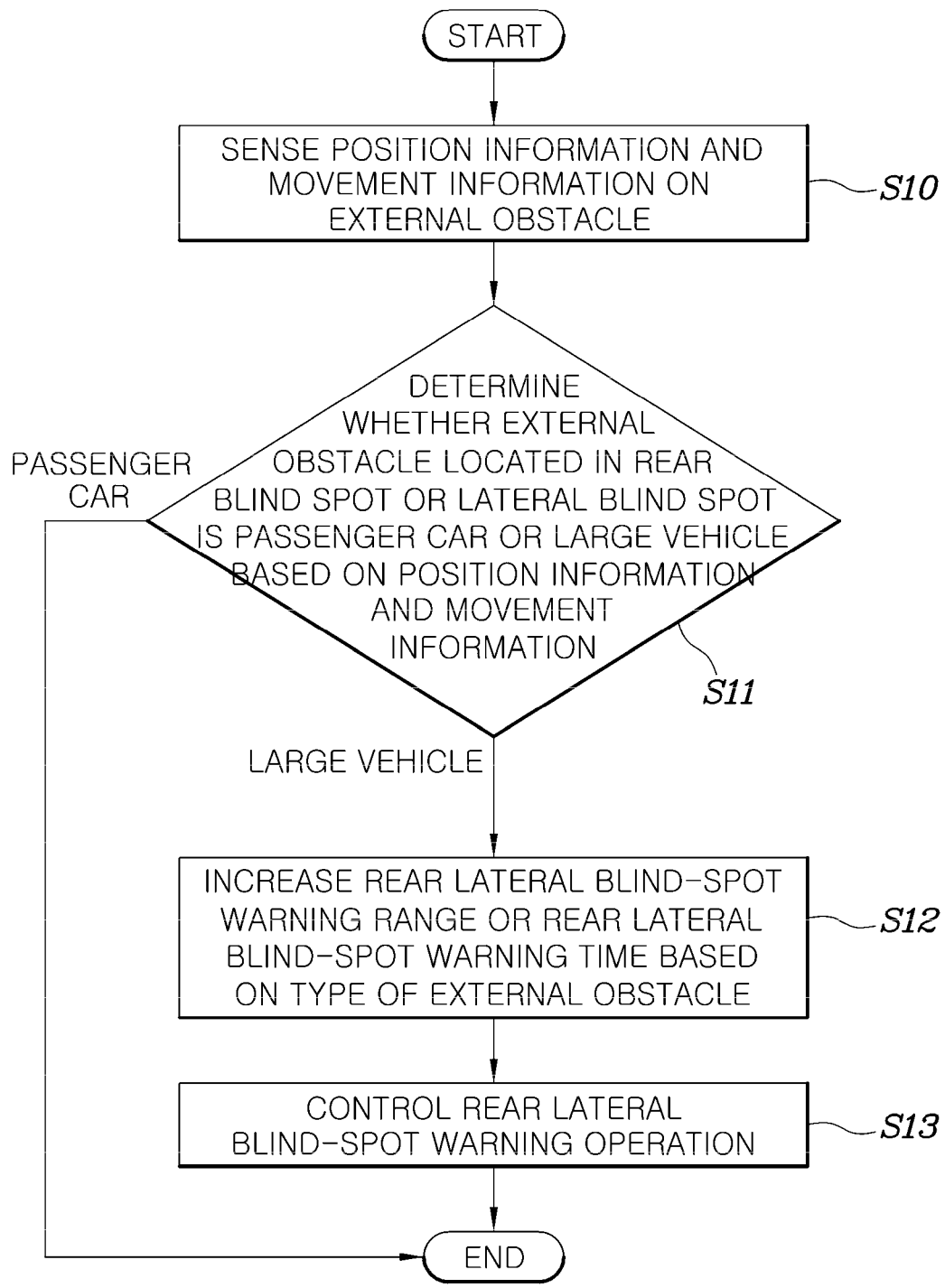
FIG. 11 is a flowchart showing a rear lateral blind-spot warning method for a vehicle according to an embodiment of the present disclosure.

FIG. 11 is a flowchart showing a rear lateral blind-spot warning method of the vehicle 100 according to an embodiment of the present disclosure.

An exemplary embodiment of the rear lateral blind-spot warning method of the vehicle 100 according to the present disclosure will be described below with reference to FIG. 11.

The rear lateral blind-spot warning method of the vehicle 100 according to the present disclosure includes a sensing step S10 of sensing position information and movement information on the external obstacle 200, a determination step S11 of determining the type of external obstacle 200 located in the rear blind spot or the lateral blind spot based on the position information and the movement information sensed in the sensing step S10, a setting step S12 of setting a rear lateral blind-spot warning range or a rear lateral blind-spot warning time based on the type of external obstacle 200 determined in the determination step S11, and a control step S13 of controlling the rear lateral blind-spot warning operation based on the rear lateral blind-spot warning range or the rear lateral blind-spot warning time set in the setting step S12.

The sensing step S10 includes sensing the position information or the movement information on the external obstacle 200 located in the rear blind spot or the lateral blind spot of the vehicle 100 using the radar sensor 50 installed in the vehicle 100.

In the sensing step S10, the position information on the external obstacle 200 is sensed through detection points that are sensed.

The determination step S11 includes forming a predetermined tracking range based on the initially sensed detection points and determining whether the external obstacle 200 is a passenger car or a large vehicle based on the detection points located within the tracking range among the initially sensed detection points.

The determination step S11 includes calculating the number of detection points, based on the sensing information and the movement information or position information on the external obstacle 200 sensed in the sensing step S10, and determining that the external obstacle 200 is a large vehicle when the number of detection points located within the tracking range is greater than or equal to the calculated number of detection points.

The determination step S11 includes determining that the external obstacle 200 is a large vehicle when the number of detection points located within the tracking range is greater than or equal to a predetermined number.

The determination step S11 includes obtaining an individual bit frequency component proportional to the distance by performing an FFT operation on the sensing signal of the sensor 10, obtaining a Doppler frequency component proportional to the speed by performing the FFT operation on the individual bit frequency component, and calculating the average frequency power of the warning region based on the distance and the speed, determined using the individual bit frequency component and the Doppler frequency component.

The determination step S11 includes determining that the external obstacle 200 is a large vehicle when the average frequency power of the warning region is greater than or equal to a predetermined power value.

The setting step S12 includes increasing the rear lateral blind-spot warning range such that the same is greater than a predetermined range when the external obstacle 200 is determined to be a large vehicle in the determination step S11.

The setting step S12 includes increasing the rear lateral blind-spot warning time such that the same is greater than a predetermined time when the external obstacle 200 is determined to be a large vehicle in the determination step S11.

As is apparent from the above description, a rear lateral blind-spot warning system and method for a vehicle according to the present disclosure are capable of recognizing whether an external obstacle located in a rear blind spot or a lateral blind spot of a host vehicle is a passenger car or a large vehicle based on detection points or the average frequency power of a radar sensor and of, when the external obstacle is determined to be a large vehicle, controlling a rear lateral blind-spot warning range or a rear lateral blind-spot warning time so as to accurately recognize the position of the large vehicle located in the rear blind spot or the lateral blind spot of the host vehicle, thereby accurately announcing the result of recognition to a driver.

Although exemplary embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A rear lateral blind-spot warning system for a vehicle, comprising:
 a sensor configured to sense position information and movement information on an external obstacle;
 a determiner configured to determine a type of the external obstacle located in a rear blind spot or a lateral blind spot of the vehicle based on the position information and the movement information sensed by the sensor;
a setter configured to set a rear lateral blind-spot warning range or a rear lateral blind-spot warning time based on the type of the external obstacle determined by the determiner; and
a controller configured to control a rear lateral blind-spot warning operation based on the rear lateral blind-spot warning range or the rear lateral blind-spot warning time set by the setter,
wherein the sensor senses the position information on the external obstacle through sensed detection points, and
wherein the determiner forms a predetermined tracking range based on initially sensed detection points and determines whether the external obstacle is a passenger car or a large vehicle based on detection points located within the predetermined tracking range among the initially sensed detection points.

2. The rear lateral blind-spot warning system for a vehicle of claim 1, wherein the sensor senses the position information or the movement information on the external obstacle located in the rear blind spot or the lateral blind spot of the vehicle using a radar sensor installed in the vehicle.

3. The rear lateral blind-spot warning system for a vehicle of claim 1, wherein the determiner calculates a number of detection points based on sensing information sensed by the sensor and the movement information or the position information on the external obstacle, and determines that the external obstacle is a large vehicle when a number of the detection points located within the predetermined tracking range is greater than or equal to the calculated number of detection points.

4. The rear lateral blind-spot warning system for a vehicle of claim 1, wherein the determiner determines that the external obstacle is a large vehicle when a number of the detection points located within the predetermined tracking range is greater than or equal to a predetermined number.

5. The rear lateral blind-spot warning system for a vehicle of claim 2, wherein the determiner obtains an individual bit frequency component proportional to a distance by performing an FFT operation on a sensing signal of the sensor, obtains a Doppler frequency component proportional to a speed by performing the FFT operation on the individual bit frequency component, and calculates average frequency power of a warning region based on the distance and the speed determined using the individual bit frequency component and the Doppler frequency component.

6. The rear lateral blind-spot warning system for a vehicle of claim 5, wherein the determiner determines that the external obstacle is a large vehicle when the average frequency power of the warning region is greater than or equal to a predetermined power value.

7. The rear lateral blind-spot warning system for a vehicle of claim 1, wherein, when the determiner determines that the external obstacle is a large vehicle, the setter increases the rear lateral blind-spot warning range such that the rear lateral blind-spot warning range is greater than a predetermined range.

8. A rear lateral blind-spot warning system for a vehicle, comprising:
a sensor configured to sense position information and movement information on an external obstacle;
a determiner configured to determine a type of the external obstacle located in a rear blind spot or a lateral blind spot of the vehicle based on the position information and the movement information sensed by the sensor;
a setter configured to set a rear lateral blind-spot warning range or a real lateral blind-spot warning time based on the type of the external obstacle determined by the determiner; and
a controller configured to control a rear lateral blind-spot warning operation based on the rear lateral blind-spot warning range or the rear lateral blind-spot warning time set by the setter wherein, when the determiner determines that the external obstacle is a large vehicle, the setter increases the rear lateral blind-spot warning time such that the rear lateral blind-spot warning time is greater than a predetermined time.

9. A rear lateral blind-spot warning method for a vehicle, comprising:
a sensing step of sensing position information and movement information on an external obstacle;
a determination step of determining a type of the external obstacle located in a rear blind spot or a lateral blind spot of the vehicle based on the position information and the movement information sensed in the sensing step;
a setting step of setting a rear lateral blind-spot warning range or a rear lateral blind-spot warning time based on the type of the external obstacle determined in the determination step; and
a control step of controlling a rear lateral blind-spot warning operation based on the rear lateral blind-spot warning range or the rear lateral blind-spot warning time set in the setting step,
wherein the sensing step comprises sensing the position information on the external obstacle through senses detection points, and
wherein the determination step comprises:
forming a predetermined tracking range based on initially sensed detection points, and
determining whether the external obstacle is a passenger car or a large vehicle based on detection points located within the predetermined tracking range among the initially sensed detection points.

10. The rear lateral blind-spot warning method for a vehicle of claim 9, wherein the sensing step comprises sensing the position information or the movement information on the external obstacle located in the rear blind spot or the lateral blind spot of the vehicle using a radar sensor installed in the vehicle.

11. The rear lateral blind-spot warning method for a vehicle of claim 9, wherein the determination step further comprises:
calculating a number of detection points, based on sensing information and the movement information or the position information on the external obstacle sensed in the sensing step; and
determining that the external obstacle is a large vehicle when a number of the detection points located within the predetermined tracking range is greater than or equal to the calculated number of detection points.

12. The rear lateral blind-spot warning method for a vehicle of claim 9, wherein the determination step further comprises determining that the external obstacle is a large vehicle when a number of the detection points located within the predetermined tracking range is greater than or equal to a predetermined number.

13. The rear lateral blind-spot warning method for a vehicle of claim 10, wherein the determination step comprises:

obtaining an individual bit frequency component proportional to a distance by performing an FFT operation on a sensing signal of a sensor;

obtaining a Doppler frequency component proportional to a speed by performing the FFT operation on the individual bit frequency component; and calculating average frequency power of a warning region based on the distance and the speed, determined using the individual bit frequency component and the Doppler frequency component.

14. The rear lateral blind-spot warning method for a vehicle of claim 13, wherein the determination step further comprises determining that the external obstacle is a large vehicle when the average frequency power of the warning region is greater than or equal to a predetermined power value.

15. The rear lateral blind-spot warning method for a vehicle of claim 9, wherein the setting step comprises increasing the rear lateral blind-spot warning range such that the rear lateral blind-spot warning range is greater than a predetermined range when the external obstacle is determined to be a large vehicle in the determination step.

16. The rear lateral blind-spot warning method for a vehicle of claim 9, wherein the setting step comprises increasing the rear lateral blind-spot warning time such that the rear lateral blind-spot warning time is greater than a predetermined time when the external obstacle is determined to be a large vehicle in the determination step.

* * * * *